Oct. 9, 1962 P. R. GRAY 3,057,963

INTER-SWITCHING CENTER TRANSFER ARRANGEMENT

Filed Oct. 27, 1959 3 Sheets-Sheet 1

INVENTOR
P. R. GRAY
BY
[signature]
ATTORNEY

Oct. 9, 1962 P. R. GRAY 3,057,963

INTER-SWITCHING CENTER TRANSFER ARRANGEMENT

Filed Oct. 27, 1959 3 Sheets-Sheet 2

INVENTOR
P. R. GRAY
BY [signature]
ATTORNEY

INTER-SWITCHING CENTER TRANSFER ARRANGEMENT

Filed Oct. 27, 1959 3 Sheets-Sheet 3

INVENTOR
P. R. GRAY
BY [signature]
ATTORNEY

3,057,963
INTER-SWITCHING CENTER TRANSFER ARRANGEMENT

Preston R. Gray, Elmhurst, N.Y., assignor to Bell Telephone Laboratories, Incorporated, New York, N.Y., a corporation of New York Filed Oct. 27, 1959, Ser. No. 848,940
17 Claims. (Cl. 179—42)

This invention relates to multi-exchange switching systems and more particularly to improvements in such systems whereby a subscriber associated with two exchanges may transfer calls on a line available to said subscriber in one exchange to a subscriber in the other exchange.

In modern telephony the trend has been toward increased flexibility and economy in switching arrangements; a trend which has fostered a large number and variety of special service features for telephone subscribers. One of these features, now well established and widely employed, is the provision at subscriber substations of access to a plurality of different line circuits. According to the needs of the subscriber, these line circuits may all be served by a single telephone exchange or may be severally distributed among two or more exchanges. Executive personnel, for instance, are often given direct susbcriber line service to both a local exchange and a nearby central office. One method of providing this service is to terminate subscriber lines directly and solely at the substation in question; another, is to employ key telephone systems to distribute a number of subscriber lines among a plurality of substations in a local area, each substation subscriber being given key access to one or more lines according to his needs.

A problem encountered by multi-line substation subscribers who are associated with more than one exchange is that when they are engaged in a call over a line circuit served by one exchange, they do not have available on that call service features provided by another exchange with which they are also associated. More particularly, a subscriber who has subscriber line service from both a central office and a local exchange does not have access to the local exchange transfer and conference facilities while he is engaged in a call on a central office line. This is a considerable limitation on the service rendered at the multi-line substation, since the substation subscriber will frequently want to transfer his central office call to another local exchange subscriber or to join that subscriber in conference relation with the established connection.

One way of meeting this problem is to provide means in a multi-line substation circuit whereby the substation subscriber can extend his central office connection into the local exchange via a local exchange subscriber line appearing at his substation. This has been done, for example, by permitting the multi-line substation subscriber to place a holding condition on his engaged central office line and then to seize a local exchange line and extend a connection thereover to the desired local exchange subscriber; these two lines could then be interconnected in the substation circuit, either inclusive or exclusive of the telephone circuit of the substation subscriber. This is not an altogether satisfactory solution to the problem, however, since it means that two of the lines at the multi-line substation will be tied-up for the duration of the transferred connection, even though the substation subscriber may have left or may never have been engaged in the said connection and may wish to initiate or receive calls over his local exchange line. Also, difficult transmission problems may arise in relation to the transferred connection; particularly if the connection is three-way and involves the substation subscriber in addition to the central office and local exchange parties.

An object of the present invention is to improve the service rendered at substations associated with two exchanges.

Another object of the invention is to provide a substation terminating a line circuit from each of two exchanges and means for extending a line circuit of one exchange to the other exchange without involving the other line circuit in this extension.

Still another object of the invention is to provide a substation associated with two exchanges and terminating a line circuit of one of these exchanges, and means for extending this line circuit to the other of these exchanges and establishing a conference connection via this means.

Yet another object of the invention is to provide a transfer circuit in accordance with the foregoing objects, whereby a line circuit of the one exchange may be extended to the other exchange and the substation may be excluded from the extended line circuit.

A specific object of the invention is to provide a transfer circuit in accordance with the foregoing objects which will cooperate with the other exchange when the other exchange is a manual exchange.

Another specific object of the invention is to provide a substation terminating two line circuits, one from each of two exchanges, with a transfer circuit which is operative to extend one of said line circuits from one exchange to the other exchange, the other exchange being an automatic exchange, whereby the other line circuit is not involved in this extension, whereby a conference connection is established in the transfer circuit, and whereby the substation may be excluded from said conference connection.

A feature of the invention is a transfer circuit which is associated with a line circuit extending between one exchange and a substation and which is located intermediate the substation and the one exchange and another exchange, whereby the line circuit may be extended to the other exchange under the control of the substation.

Another feature of the invention is a transfer circuit as aforesaid having means for linking the transfer circuit to the other exchange independently of any line circuits which may be directly interconnecting the substation and the other exchange.

Still another feature of the invention is a transfer circuit as aforesaid and provided with means whereby the line circuit extending between the one exchange and the substation may be divided into two portions and both of these portions extended to the other exchange via the linking means and connected in conference relation with the linking means.

Yet another feature of the invention is a transfer circuit in accordance with the foregoing features and wherein a relay is provided which is operable under the control of the substation circuit for disconnecting, and thereby excluding one of the line circuit portions from the conference connection.

A specific feature of the invention is a manual transfer circuit located intermediate a substation, a primary telephone exchange, and a manual secondary telephone exchange.

Before proceeding with a detailed description of the specific transfer and conference circuitry shown in FIGS. 2 and 3, the physical and functional relationships of the major system components will be described in a general manner as an aid in understanding the character and structure of the invention.

Figure 1:
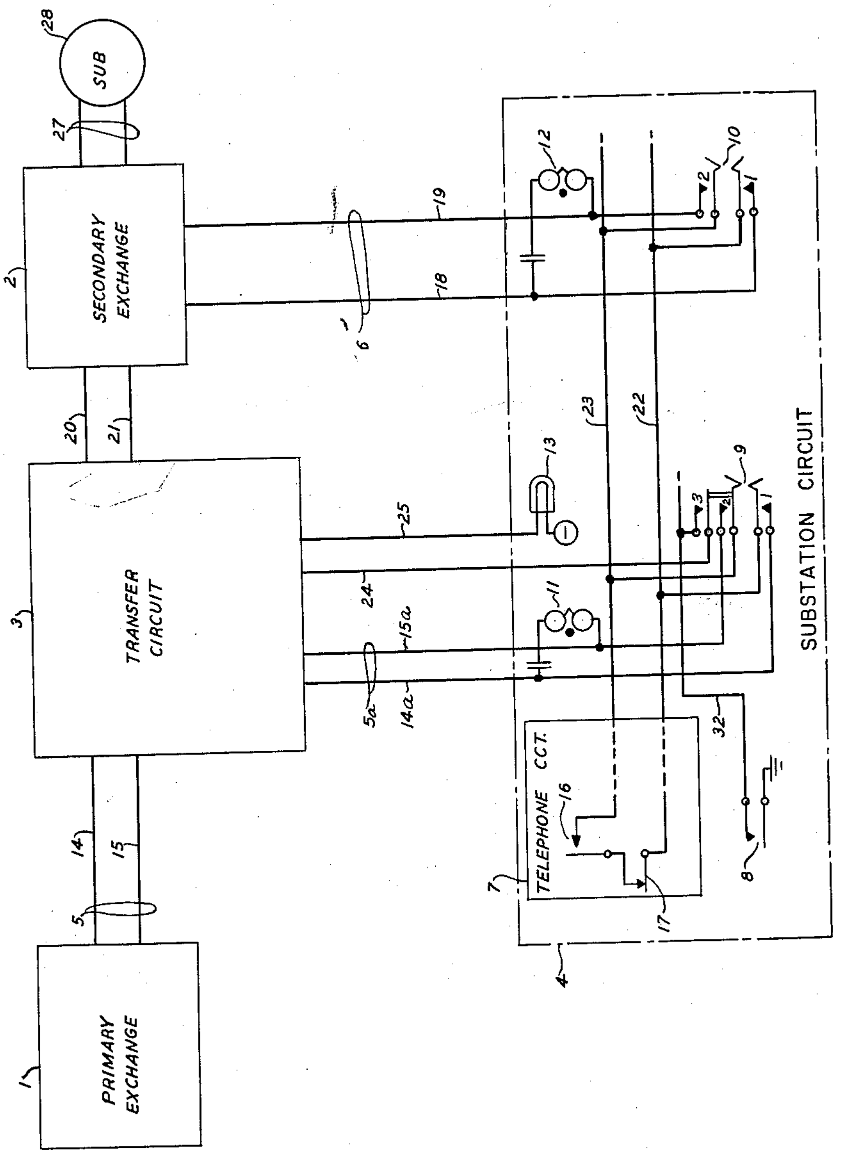
FIG. 1 shows a diagram useful in describing the overall systems aspects of the invention.

Referring now to FIG. 1, substation 4 is shown having access to direct subscriber line service from primary and secondary exchanges 1 and 2 over subscriber line circuits 5 and 6, respectively (the line circuit **5*a* is a portion of line circuit 5). Transfer circuit 3 is shown interposed in line circuit 5 intermediate the two exchanges 1 and 2 and substation circuit 4. It is transfer circuit 3 which is operable under the control of the subscriber at substation 4 and has the features previously enumerated. More particular consideration will be given to the circuitry of transfer circuit 3** when FIGS. 2 and 3 are discussed hereinafter.

Primary and secondary exchanges 1 and 2 are switching centers offering direct subscriber line service and may be either manual or dial (automatic) exchanges. The instant invention will find its most usual, though not exclusive, application in situations wherein primary exchange 1 is a central office and secondary exchange 2 is a local or private branch exchange (PBX). No such limitation is inherent in the invention, however, and it is to be understood that primary exchange 1 may be either a central office or a PBX; this is true for secondary exchange 2 also. It is immaterial for the purposes of this invention whether primary exchange 1 is a manual or an automatic exchange. This is a material consideration with regard to secondary exchange 2, however, since transfer circuit 3 will take one of at least two forms (transfer circuits **3*a* and 3*b*) depending upon whether secondary exchange 2 is automatic (FIG. 2; transfer circuit 3*a*) or manual (FIG. 3; transfer circuit 3*b*). A. E. Reinke Patent 1,539,866 of June 2, 1925 and R. D. Williams Patent 2,904,637 of September 15, 1959 respectively disclose examples of suitable such manual and automatic secondary exchanges. For clarity and convenience in the description to follow, secondary exchange 2 of FIG. 1 will be designated by the symbol 2*a* if it is an automatic exchange and by the symbol 2*b* if it is manual. Correspondingly, transfer circuit 3 of FIG. 1 will be designated 3*a* or 3*b* depending upon whether dial transfer circuit 3*a* of FIG. 2 or manual transfer circuit 3*b* of FIG. 3 is intended. The symbols 2 and 3** will continue to be used when the terms secondary exchange and transfer circuit are used generically without regard to the aforementioned distinction.

Substation circuit 4, shown partially in block diagram form, comprises telephone circuit 7 having switchhook contact 16 and dial contact 17, line pickup keys 9 and 10, common talking conductors 22 and 23, common signaling conductor 32, signaling key 8, transfer conductor 24, lamp conductor 25, and busy lamp 13. Telephone circuit 7 may be any suitable arrangement having the usual receiver, transmitter and associated circuitry. Such associated circuitry will include a switchhook contact, represented by normally open contact 16, for connecting and disconnecting telephone circuit 7 from talking conductors 22 and 23. In addition, some signaling means will generally be provided to permit signaling from telephone circuit 7 over a subscriber line circuit that is connected thereto; such a means is represented by normally closed dial contact 17 which may be opened and closed in a well-known manner to generate dial pulses over a connected line circuit. Switchhook and dial contacts 16 and 17 of telephone circuit 7 have been shown in FIG. 1 as an aid in describing, hereinafter, the detailed operation of the exemplary embodiments of the instant invention; the remainder of the telephone circuit is omitted, this omission being indicated by the dotted lines extending into telephone circuit 7 from conductors 22 and 23. Although the particular configuration of telephone circuit 7 is not critical herein, an example of such a circuit may be taken as that shown in A. J. Aikens et al. Patent 2,732,436 of January 24, 1956.

Line keys 9 and 10 are operative to connect the subscriber line circuits terminating thereat, line circuits 5 and 6, respectively, to talking conductors 22 and 23 of substation circuit 4. In addition to make contacts 1 and 2 which are effective to interconnect line circuit 5 and substation circuit 4, line key 9 has a third make contact, contact 3, for interconnecting conductors 32 and 24. Line key 10 has contacts 1 and 2 corresponding to those of line key 9. No particular type of key construction or arrangement is necessary for line keys 9 and 10 so long as they are effective to accomplish the aforementioned connection functions. An example of a satisfactory line key arrangement, involving interlocking line keys, may be found in F. E. Wood et al. Patent 2,589,180 of March 11, 1952. The use of interlocking line keys is preferable in that it prevents the inadvertent seizure of more than one line at a time by the substation subscriber. Other line keys, terminating line circuits other than the two shown, as well as special purpose keys, such as keys for holding, may also be provided at substation 4.

Common talking conductors 22 and 23 are the tip and ring conductors, respectively, of substation circuit 4 and are common to all of the line keys associated therewith. Conductors 22 and 23 terminate in telephone circuit 7 and are connectable to line circuits 5 and 6 at contacts 1 and 2, respectively, of line keys 9 and 10, respectively. The right-hand extremities of conductors 22 and 23 are dotted to indicate that other line circuits besides the two shown may be accessible over other line keys (not shown) at substation 4. When the subscriber at substation 4, who shall be referred to as subscriber 4 hereinafter, goes "off hook" (closes switchhook contact 16 of telephone circuit 7), conductors 22 and 23 are bridged by telephone circuit 7 under the control of switchhook and dial contacts 16 and 17 of that circuit.

Common signaling conductor 32 extends from nonlocking signaling key 8 in substation circuit 4 to make contact 3 of line key 9 and is dotted at its right-hand extremity to indicate that it may be multipled to other line keys terminating lines which have a transfer circuit such as transfer circuit 3, associated therewith. Signaling key 8 is effective, when operated, to place a ground potential on conductor 32.

Transfer conductor 24 extends from contact 3 of line key 9 to transfer circuit 3. When line key 9 and signaling key 8 are operated concurrently, ground potential is placed on conductor 24 from conductor 32 and signaling key 8 to effect circuit changes in transfer circuit 3 as will be described in detail hereinafter.

Busy lamp 13 is associated with line circuit 5 and is lighted from transfer circuit 3 via conductor 25 when transfer circuit 3 is in use.

Conductors 18 and 19 are the tip and ring conductors, respectively, of subscriber line circuit 6 of secondary exchange 2, which line circuit 6 terminates on line key 10 of substation circuit 4. Conductors **14*a* and 15*a* are the tip and ring conductors, respectively, of portion 5*a* of subscriber line circuit 5 of primary exchange 1, which line circuit 5 terminates on line key 9 of substation circuit 4. Conductors 14*a* and 15*a* correspond, respectively, to conductors 14 and 15 of line circuit 5 shown extending between primary exchange 1 and transfer circuit 3 in FIG. 1. Line circuit 5 is thus divided into two portions, a first portion extending between primary exchange 1 and transfer circuit 3 and represented by conductors 14 and 15, and a second portion extending between transfer circuit 3 and substation 4 represented by corresponding conductors 14*a* and 15*a*. Except when transfer circuit 3 is in use, these corresponding conductors are normally continuous through transfer circuit 3 which plays no part in ordinary calls over line circuit 5**.

Transfer circuit 3 is located intermediate and independent of primary and secondary exchanges 1 and 2 and substation 4; independent, in the sense that transfer circuit 3 does not form an integral part of any of these units, nor does it exert influence over or become influenced by normal between-unit traffic not involving the instant transfer and conference arrangement. As previously mentioned, primary exchange subscriber line circuit 5 is normally continuous (conductors 14 and 15 and directly connected to conductors 14*a* and 15*a*, respectively) through transfer circuit 3. Tip and ring conductors 20 and 21 extend between transfer circuit 3 and secondary exchange 2, constituting a metallic circuit therebetween. If secondary exchange 2 is an automatic exchange, secondary exchange 2*a*, these conductors are the tip and ring conductors, respectively, of a line circuit (line circuit 29 of FIG. 2), such as a tie line circuit, for example. If secondary exchange 2 is manual, secondary exchange 2*b*, conductors 20 and 21 extend to the attendant position (jack 40 of FIG. 3) of that exchange. The operation and constitution of transfer circuit 3 will be discussed in detail when FIGS. 2 and 3 are considered, infra.

When a call is directed to substation 4 from primary exchange 1, ringing current will be applied to line circuit 5 in the usual manner to activate ringing device 11 associated with line circuit 5 at substation 4. Subscriber 4 will thus be alerted and may join his telephone circuit 7 to line circuit 5 by closing switch hook contact 16 and operating line key 9, thereby completing a circuit from telephone circuit 7 over tip conductor 22, contact 1 of line key 9, tip conductor 14*a* of the portion 5*a* of line circuit 5, transfer circuit 3, tip conductor 14 of line circuit 5, through the switching equipment of primary exchange 1 and over the line loop associated with the substation of the calling party (not shown), back through exchange 1 to ring conductor 15 of line circuit 5, transfer circuit 3, ring conductor 15*a* of the portion 5*a* of line circuit 5, contact 2 of line key 9, ring conductor 23, and back to telephone circuit 7. Telephone circuit 7, including closed series contacts 16 and 17, bridges this circuit. Subscriber 4 may then converse with the calling party. If it develops that the calling party should be transferred to a substation in secondary exchange 2, such as substation 28 for instance, or that such substation 28 should be added to the connection already established over subscriber line 5, subscriber 4 will operate signaling key 8 momentarily. Through a sequence of circuit operations to be described in detail hereinafter, the subscriber at substation 28 (who will be referred to henceforth as subscriber 28) of secondary exchange 2 may then be joined in a three-way conference connection with the calling party and subscriber 4. The conference connection is established through capacitors in transfer circuit 3. Subscriber 28 has access to the conference connection via conductors 20 and 21 which join transfer circuit 3 and secondary exchange 2; the calling party is joined in the connection over conductors 14 and 15 (the first portion of line circuit 5) which are now terminated in transfer circuit 3; and subscriber 4 is in the conference via conductors 14*a* and 15*a* (the portion 5*a* of line circuit 5) which are also terminated in transfer circuit 3 at this time. Transfer circuit 3 supplies talking battery to subscriber 4 over the second portion of line circuit 5, thereby avoiding transmission difficulties in the three-way conference connection. Viewed in relation to its transfer capability, transfer circuit 3 may be said to have effectively extended line circuit 5 to secondary exchange 2 in bypass of line circuit 6. It will be noted that line circuit 6 is not involved in this extension, having been bypassed through the utilization of transfer circuit 3.

Although the foregoing description has subscriber 28 being added to a call previously received by subscriber 4 at substation 4, this was merely an illustrative situation and the conference could as readily have been established on a call over line circuit 5 and which had been initiated by subscriber 4. For convenience and consistency in terminology hereinafter, however, the subscriber on the end of line circuit 5 toward primary exchange 1 will be referred to as the calling party.

With the establishment of the conference connection, subscriber 4 may opt to remain in the connection, to lock himself out of (exclude himself from) the connection between subscriber 28 and the calling party, or to simply leave the connection while retaining access thereto. In any event, if he releases himself from the conference arrangement, subscriber 4 is free to place or receive calls over any of the subscriber lines terminating at substation circuit 4 except line 5. In particular, the subscriber at substation 4 still has access to secondary exchange 2 via line circuit 6. Transfer circuit 3 maintains busy lamp 13 lighted for as long as this circuit is in use, whether subscriber 4 is in the connection or not; subscriber 4 is thus given a visual indication of the busy status of subscriber line circuit 5.

In FIG. 1 and in the foregoing description, line circuit 5 of primary exchange 1 terminates directly and solely on line key 9 of substation 8. It will be obvious, however, that the instant invention is also applicable to situations wherein line circuit 5 is multipled to and has key appearances at a plurality of substations such as substation 4. Such a situation occurs, for instance, when a multiple-access, line distribution system is employed in business establishments and the like to achieve efficient use of subscriber line circuits terminating thereat. The key telephone system of H. T. Carter Patent 2,850,579 of September 2, 1958 is exemplary of this type of distribution system. The instant invention is readily utilizable with such a system and can be adapted thereto by interposing transfer circuit 3 on the side of the system toward primary exchange 1 and by multiplying transfer lead 24 and busy lamp lead 25 of FIG. 1 to all the substations of the system having a key appearance of line circuit 5; thus, all such substations have access to transfer circuit 3 in the same manner as is described for substation 4.

DIAL TRANSFER CIRCUIT

Figure 2:
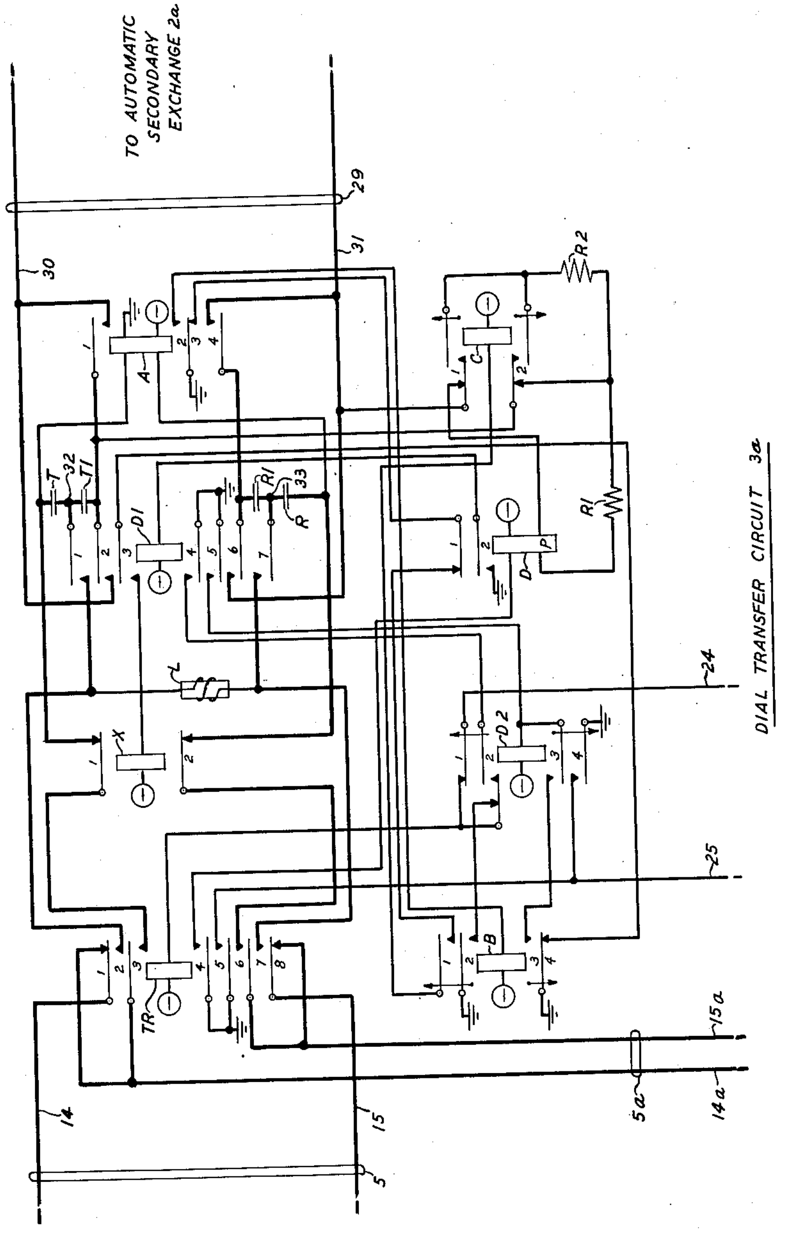
FIG. 2 shows a dial transfer circuit arranged to cooperate with an automatic telephone exchange.

Dial transfer circuit 3*a* of FIG. 2 is designed to cooperate with automatic secondary exchange 2*a*. After a connection has been established between the calling party and subscriber 4 over line circuit 5 and it is desired to transfer the call to a subscriber in secondary exchange 2*a* or to add such a subscriber to the established connection, subscriber 4 will obtain access to secondary exchange 2*a* via transfer circuit 3*a* by operating signaling key 8. Through a sequence of circuit operations which will be described in detail hereinafter, line circuit 5 will be extended to secondary exchange 2*a* and subscriber 4 will hear dial tone and dial the telephone number of the desired subscriber, say subscriber 28. A three-way conference connection will then be established in transfer circuit 3*a* among the calling party and subscribers 4 and 28.

*Seizure of Line Equipment*

Referring now to FIG. 2, tip and ring conductors 14 and 15 of line circuit 5 are connected to tip and ring conductors 14*a* and 15*a*, of the portion 5*a* of line circuit 5, over break contacts 1 and 8, respectively, of transfer relay TR. When subscriber 4, at substation 4 of FIG. 1, desires to add a substation of automatic secondary exchange 2*a* to the subscriber 4—calling party connection, or to transfer the calling party thereto, subscriber 4 will operate signaling key 8 momentarily. The operation of signaling key 8 completes a circuit which extends from ground in substation circuit 4, over the closed contact of signaling key 8 to signaling lead 32, over make contact 3 of line key 9 to transfer lead 24, and over break contact 1 of relay D2 in FIG. 2 to battery (other terminal assumed to be grounded) through the winding of transfer relay TR. Relay TR operates in this circuit.

The operation of relay TR transfers conductors 14 and 15 of line circuit 5, from conductors 14*a* and 15*a* leading to substation 4, to a holding bridge constituted by inductor (coil) L via make contacts 2 and 7, respectively, of relay TR. Besides being bridged by inductor L, conductors 14 and 15 are now terminated at make contacts 1 and 7, respectively, of unoperated relay D1 in preparation for terminating these conductors in a conference arrangement to be established within transfer circuit 3*a*.

Relay TR, in operating, also lights busy lamp 13, associated with line circuit 5 in substation circuit 4 of FIG. 1, in a circuit extending from ground at make contact 5 of relay TR to conductor 25 and through busy lamp 13 to battery. Busy lamp 13 remains lighted in this circuit, or in an auxiliary circuit from ground at make contact 4 of relay D2, for as long as transfer circuit 3*a* is in use. Relay TR also prepares polar relay D for subsequent operation by energizing the upper winding thereof in a path extending from ground at make contact 4 of relay TR to battery through the aforementioned winding. Relay D does not operate at this time.

Finally, relay TR transfers conductors 14*a* and 15*a* of line circuit 5 from conductors 14 and 15 leading to primary exchange 1 and terminates these conductors at the windings of polar relay A via make contacts 3 and 6, respectively, of relay TR. The circuit thus established may be traced from ground at relay A through the upper winding of that relay, over break contact 1 of unoperated relay X, make contact 3 of relay TR, tip conductor 14*a*, make contact 1 of line key 9 in substation circuit 4 of FIG. 1, common tip conductor 22, through telephone circuit 7 including series contacts 16 and 17, over common ring conductor 23, make contact 2 of line key 9, ring conductor 15*a* of line circuit 5, make contact 6 of relay TR in FIG. 2, break contact 2 of relay X, to battery through the lower winding of relay A. Relay A operates in this circuit from the bridge constituted by telephone circuit 7 in substation 4 and provides talking battery to that telephone circuit.

Relay A, in operating, connects a bridge, consisting of resistor R1 in series with the lower winding of polar relay D, across line circuit 29 (corresponding to conductors 20 and 21 of FIG. 1) of secondary exchange 2*a*, thus seizing the line equipment (not shown) associated with this line in secondary exchange 2*a*. The bridge connection can be traced from tip conductor 30 of line circuit 29 over make contact 1 of relay A, transfer contact 2 of unoperated relay C, resistor R1, the lower winding of relay D, and transfer contact 1 of relay C to ring lead 31 of line circuit 29. Polar relay D does not operate in this circuit since the battery and ground connected to conductors 30 and 31 by the equipment (not shown) associated with line circuit 29 in secondary exchange 2*a* is not of the correct polarity at this time. The resistance of resistor R1 is approximately 500 ohms. When line circuit 29 has been bridged in the aforementioned manner, this will appear to exchange 2*a* like the usual situation where a line is bridged by a telephone circuit and a request for service will thus be instituted in the exchange. Automatic secondary exchange 2*a* will react in the customary manner to attach a selector, selector-connector, dial pulse register, or like device (not shown) to line circuit 29 and place dial tone on that circuit. This dial tone can be heard by subscriber 4 over a circuit extending from conductor 30 of line circuit 29, make contact 1 of relay A, capacitors T1 and T, contact 1 of relay X, contact 3 of relay TR, conductor 14*a*, contact 1 of line key 9 of substation circuit 4 in FIG. 1, common conductor 22, telephone circuit 7 including series contacts 16 and 17, common conductor 23, contact 2 of line key 9, conductor 15*a*, contact 6 of relay TR in FIG. 2, contact 2 of relay X, capacitors R and R1, and make contact 4 relay A to conductor 31 of line circuit 29.

The operation of relay A also causes the operation of relay B in a circuit extending from ground at make contact 2 of relay A to battery through the winding of relay B. Relay B, in operating, (1) provides a supplementary locking path for relay TR in a circuit extending from ground at make contact 2 of relay B and over transfer contact 2 of unoperated relay D2 to battery through the winding of relay TR; (2) prepares a supplementary locking path for relay D2 over make contact 3 of relay B; (3) opens, at its back contact 4, a link in the operating path for relay X, which operating path may be traced from ground at back contact 4 of relay B to battery through the winding of relay X via make contact 3 of relay D1; and (4) closes, at its make contact 1, a link in the operating path for relay C.

At this point in the operation of transfer circuit 3*a*, then, relays TR, A and B thereof are operated and subscriber 4 is hearing dial tone transmitted over line circuit 29 from secondary exchange 2*a*. Subscriber 4 can now dial the extension number of the desired subscriber in secondary exchange 2*a*, who may be, for instance, the subscriber at substation 28 (see FIG. 1), accessible over subscriber line circuit 27.

*Dialing*

As subscriber 4 at substation 4 manipulates his dialing device (not shown), opening and closing dial contact 17 of telephone circuit 7 in accordance with the extension number of the party to be added, the operation of contact 17 generates dial pulses in the well-known manner by opening and closing the line circuit connected to telephone circuit 7, over line key 9 of substation circuit 4. This line circuit is now the operating circuit for relay A of transfer circuit 3*a*, as previously traced, and relay A will therefore follow the aforementioned dial pulses, releasing as dial contact 17 opens at the start of each pulse of each digit and reoperating when contact 17 closes at the end of each open line dial pulse. When relay A releases at the beginning of the first pulse of the first digit dialed, relay C is operated in a circuit extending from ground at contact 3 of relay A, over break contact 1 of unoperated relay D and make contact 1 of operated relay B to battery through the winding of relay C. The release of relay A also opens the operating path of relay B but the latter relay, having a slow release characteristic, remains operated during the open line loop periods (releases of relay A) representing pulses. Relay C, in operating, changes the previously traced bridge across line circuit 29 of secondary exchange 2*a* to a short circuit in series with make contacts 1 and 4 of relay A. This short circuit can be traced from tip conductor 30 of line circuit 29 over make contact 1 of relay A, transfer contact 2 of operated relay C, and transfer contact 1 of relay C to ring lead 31 of line circuit 29. Relay A will therefore repeat the dial pulses generated at substation 4 by opening and closing line circuit 29 of secondary exchange 2*a* on a loop dialing basis. Relay C has a slow release characteristic and remains operated during the dialing of the pulses of each digit of the extension number of the added party. If the interdigital pause is long enough relay C will release, substituting the previously described relay D-resistor R1 bridge for the aforementioned short circuit. This has no significant effect upon the circuit at this time.

At the end of dialing, relays TR, A and B of transfer circuit 3*a* will be operated and secondary exchange 2*a* will act on, or will have acted upon, the received dial pulses, according to its customary mode of operation, to either extend a connection from line circuit 29 to line circuit 27 of the party 28 to be added and apply ringing current to the latter line circuit, or, in the event that line circuit 27 is in use, return busy tone over line circuit 29 to subscriber 4 via the previously traced path through capacitors T1, T, R and R1.

*Subscriber 28 Answers*

Assuming that subscriber 28 of secondary exchange 2*a* is not busy, he will answer the call from subscriber 4 by going off hook. When subscriber 28 goes off hook, a reverse battery supervisory signal will be impressed upon line circuit 29 toward transfer circuit 3*a*. This battery reversal will cause the direction of current flow in the previously traced bridge, comprising the lower winding of polar relay D and resistor R1, to reverse, thereby operating relay D. Relay D, in operating, operates relay D1 in a path from ground at make contact 2 of relay D to battery through the winding of relay D1. The operation of relay D at its break contact 1 also opens the previously traced operating path for relay C, relay C being thereby released at this time, thus positively preventing the reoperation of relay C if and when subscriber 4 disconnects (releasing relay A) while subscriber 28 remains connected in the conference connection.

Relay D1, in operating, prepares a locking path for relay TR which extends from ground at make contact 4 of relay D1 to transfer contact 2 of relay D2. This path will be established for the purpose of maintaining relay TR operated when relay D2 operates. Relay D1, over make contacts 2 and 6 thereof, also closes an auxiliary path for tip and ring conductors 30 and 31, respectively, of line circuit 29, around make contacts 1 and 4 of relay A; thereby making the connection of line circuit 29 to transfer circuit 3*a* independent of relay A and, consequently, independent of whether subscriber 4 remains in on the connection or disconnects therefrom.

The operation of relay D1 completes a talking path among the calling party and subscribers 4 and 28 by extending tip and ring conductors 14 and 15 of the central office end of line circuit 5 to terminals 32 and 33, respectively, of transfer circuit 3*a*. Terminal 32 is located between capacitors T and T1, and terminal 33 is located between capacitors R and R1. Terminals 32 and 33 and the capacitors R, R1, T and T1 associated therewith comprise the junction portion of transfer circuit 3*a*. Conductor 14 now extends from primary exchange 1 over contact 2 of relay TR and contact 1 of relay D1 to terminal 32. Ring conductor 15 extends from primary exchange 1 over contact 7 of relay TR and contact 7 of relay D1 to terminal 33. The calling party is now joined in a talking connection with subscriber 28 through capacitors T1 and R1, and is in a talking connection with subscriber 4 through capacitors T and R. Subscribers 4 and 28 can converse with one another across both sets of capacitors aforementioned.

Still another result of the operation of relay D1 is the operation of relay D2 from ground at make contact 5 of relay D1. The operation of relay D2 establishes a supplementary operating path for busy lamp 13 by connecting ground from make contact 4 of relay D2 to conductor 25. Relay D2 also closes a supplementary locking path for itself under the control of relay B which may be traced from ground at make contact 3 of relay B, over contact 3 of relay D2, to battery through the winding of relay D2. Still another result of the operation of relay D2 is to transfer the previously traced locking path for relay TR from contact 2 of relay B to contact 4 of relay D1. The new locking path can be traced from ground at make contact 4 of relay D1, over transfer contact 2 of operated relay D2 and to battery through the winding of relay TR.

At this point in the circuit operation, then, all three parties are in talking relation with one another in a three-way conference connection through capacitors, and, in transfer circuit 3*a*, relays TR, A, B, D, D1, and D2 are operated.

*Subscriber 28 Busy or Does Not Answer*

If subscriber 28 is busy or does not answer, subscriber 4 will disconnect momentarily (open the operating circuit for relay A at switchhook contact 16 of telephone circuit 7) to allow transfer circuit 3*a* to restore to normal. It will be recalled that, under these circumstances, only relays A, TR and B will have been operated.

When switchhook contact 16 of substation 4 is momentarily opened, relay A will release. Relay A, in releasing, will open the operating circuit for relay B at make contact 4 of relay A. Relay B, at contact 2 thereof, will cause the release of relay TR when relay B releases, by opening the operating circuit of relay TR. Relay B is slow to release and, as a consequence, relay C will operate over its previously traced operating path during the interval in which relay A is released and relay B is still operated. Relay C will then release when relay B finally releases. This momentary operation of relay C is of no consequence.

The release of relay TR will extinguish busy lamp 13 by opening the circuit therefor at make contact 5 of that relay. Busy lamp 13, in becoming extinguished, will indicate to subscriber 4 that transfer circuit 3*a* has restored to normal and that an attempt may be made to reach another substation of secondary exchange 2*a*.

*Disconnection—Subscriber 4 Disconnects First*

Assume now that a three-way conference connection among the calling party and subscribers 4 and 28 has been established in the manner previously described and that subscriber 4 wishes to leave the connection. Subscriber 4 may disconnect either by hanging up (opening the operating circuit of relay A at switchhook contact 16 of telephone circuit 7) or, if interlocking line keys are employed, by operating another line key of substation circuit 4, such as line key 10. As was pointed out above, the various line keys are preferably of the interlocking type and the depression of one would be effective, therefore, to release any other key which happened to be then operated. Whether subscriber 4 hangs up or operates another line key, however, the effect upon transfer circuit 3*a* will be the same: the previously traced operating circuit of relay A, which extends over line key 9 and through telephone circuit 7, will be opened, causing the release of relay A.

Relay A, in releasing, opens the operating path of relay B at make contact 2 of relay A, causing relay B to begin to release. Relay B is slow to release and, while relay A is released and relay B is not, relay C will operate momentarily until relay B releases completely. This momentary operation of relay C is of no consequence. When relay A releases, a link in the connection of line circuit 29 to transfer circuit 3*a* will be opened at make contacts 1 and 2 of relay A. This does not affect the connection between the calling party and subscriber 28, however, since, as was previously pointed out, an auxiliary path for line circuit 29 has been established via contacts 2 and 6 of relay D1.

When relay B releases, the supplementary locking path for relay D2 is opened at contact 3 of relay B. Relays TR and D2 remain operated, however, under the control of relay D1. The release of relay B will also complete the operating path for exclusion relay X, which path can be traced from ground at break contact 4 of relay B, over contact 3 of relay D1 and through the winding of relay X to battery. Relay X operates at this time.

Relay X provides an exclusion feature in transfer circuit 3*a*. If this relay were not provided, subscriber 4 would always be able to re-enter the calling party-subscriber 28 connection, after he had disconnected, by merely connecting his telephone circuit 7 to line circuit 5 at line key 9. It is usually desirable, however, that subscriber 4 have the ability to exclude himself completely from the transferred connection. Assuming now that it has been found desirable to provide the exclusion feature, and thus enable subscriber 4 to confer privacy upon the calling party-subscriber 28 connection which he has established, relay X will be provided. The operation of relay X, as hereinbefore described, will prevent subscriber 4 from re-entering the calling party-subscriber 28 connection by opening the previously described access path of the called party at break contacts 1 and 2 of relay X. Relay X will remain operated for the duration of the calling party-subscriber 28 connection under the control of relay D1.

Even if the relay X exclusion feature is provided, the called party may still have the option of disconnecting from the conference connection and retaining his ability to re-enter it. Most modern key telephone sets, such as the one shown in the Wood patent, supra, are provided with means for holding, enabling the subscriber having such a telephone set to hold one of the lines terminating at his substation circuit while making or receiving calls on another line or performing some other action, necessitating absence from the said one line. Assuming that substation circuit 4 is provided with such means (not shown), subscriber 4 will be able to place a holding bridge (not shown) across conductors 14*a* and 15*a*, thus maintaining the operating circuit of relay A and preventing the operation of relay X or any of the other changes in transfer circuit 3*a* described above with respect to subscriber 4 having disconnected first.

*Subscriber 28 Disconnects After Subscriber 4*

Assuming that subscriber 4 has disconnected from the conference connection, transfer circuit 3*a* will be left under the control of subscriber 28 in secondary exchange 2*a*. When subscriber 28 disconnects (hangs up, opening line circuit 29), the switching equipment (not shown) in secondary exchange 2*a* will restore the battery and ground on tip and ring conductors 30 and 31 of line circuit 29 toward transfer circuit 3*a* to their original polarity in accordance with the usual supervisory techniques. This restoration of polarity on line circuit 29 will be detected by relay D which will release in response to the reversal of current through its lower winding. Relay D, in releasing, will release relay D1, which in turn will release relays X, D2, and TR. Relay TR, in releasing, removes the inductor L bridge from line circuit 5, thus providing disconnect supervision toward primary exchange 1. Relay D2 has a slow release characteristic which is effective to maintain busy lamp 13 lighted until transfer circuit 3*a* and the equipment in secondary exchange 2*a* associated with line circuit 29 have restored to normal. When busy lamp 13 is finally extinguished, subscriber 4 will know that he is free to initiate and receive calls on line circuit 5 once more.

*Subscriber 28 Disconnects First*

When subscriber 28 disconnects first on a three-way conference connection, transfer circuit 3*a* will restore to normal and the calling party and subscriber 4 will be returned to their original two-way connection over line circuit 5 of primary exchange 1, which connection does not involve transfer circuit 3*a* except insofar as the break contacts 1 and 8 of relay TR are concerned. When subscriber 28 disconnects, opening line circuit 27, relays D, D1 and TR of transfer circuit 3*a* will restore as described in the preceding paragraph. Relay D2 will remain operated under the control of relay B, however, the latter relay being still operated at this time since subscriber 4 has not disconnected. When relay TR releases, the operating circuit for relay A is opened, releasing relay A, which in turn releases relay B. The release of relay B will cause relay D2 to release, extinguishing busy lamp 13 at substation 4. The transmission path between the calling party and subscriber 4 will be opened for a momentary interval during the sequential release of relays D1 and TR. When relay TR finally releases, however, conductors 14 and 15 are connected to conductors 14*a* and 15*a* over break contacts 1 and 8, respectively, of relay TR, thereby making line circuit 5 continuous once again. Due to the slow release characteristic of relay D2, busy lamp 13 will be kept lighted during the aforementioned momentary interval. At this point, transfer circuit 3*a* will be restored to normal and the original connection re-established directly between the calling and called parties over line circuit 5.

It will be obvious that once subscriber 28 of secondary exchange 2*a* has left the three-way conference connection, as described above, subscriber 4 may once again seize transfer circuit 3*a* and extend line circuit 5 to secondary exchange 2*a* for the purpose of contacting another subscriber in that exchange.

MANUAL TRANSFER CIRCUIT

In the forthcoming portion of the circuit description, the following conventions will continue to be observed: the party at the end of line circuit 5 in primary exchange 1 will be referred to as the calling party; the party at substation circuit 4 will be referred to as subscriber 4 and the party in secondary exchange 2 who is to be added to the connection previously established on line circuit 5 between the calling party and subscriber 4 will be referred to as subscriber 28 (see FIG. 1). For this portion of the circuit description, however, secondary exchange 2 of FIG. 1 now takes the form of a manual exchange and will be referred to as secondary exchange 2*b*. Transfer circuit 3 of FIG. 1 becomes (manual) transfer circuit 3*b* to cooperate with secondary exchange 2*b*.

Figure 3:
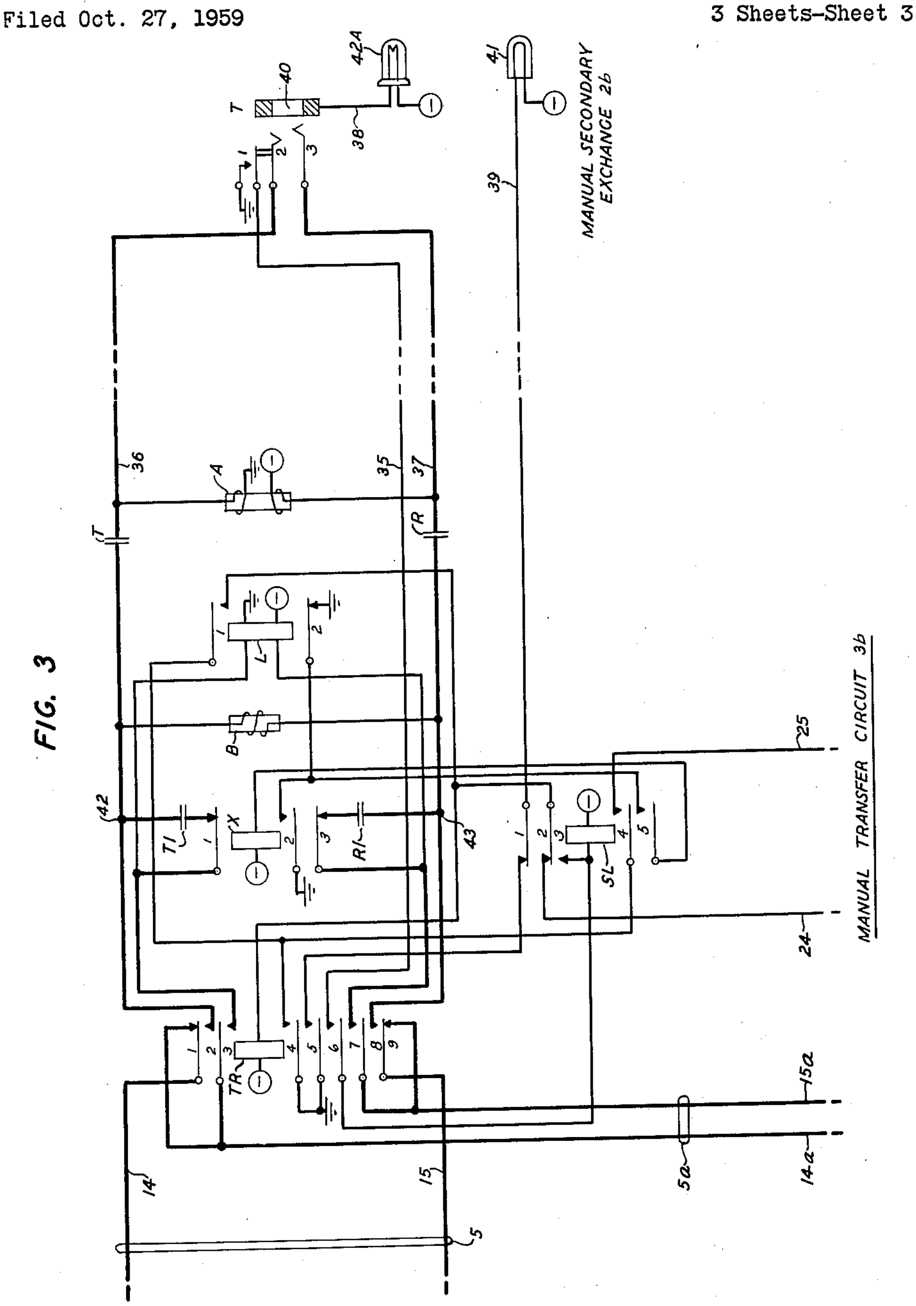
FIG. 3 shows a manual transfer circuit arranged to cooperate with a manual telephone exchange.

FIG. 3 show stransfer circuit 3*b*, designed to cooperate wth a manual secondary exchange 2*b* such as that described in the Reinke patent, supra. On the right side of FIG. 3, attendant jack 40 and lamp 41 are shown and represent the attendant position appearance of transfer circuit 3*b* in secondary exchange 2*b*. Tip and ring conductors 36 and 37 correspond to conductors 20 and 21 of FIG. 1. The usual cord circuits, etc., will of course be provided at the attendant position for enabling the attendant to extend connections from the aforementioned appearance to substation line circuits, such as line circuit 27 of FIG. 1, for example, in secondary exchange 2*b*. In the present illustrative embodiment of the invention, transfer circuit 3*b* is made to appear, at attendant jack 40, as an incoming trunk. Connections extended by the attendant from this jack are therefore performed in the same manner as for normal incoming calls from other exchanges.

It will be assumed now that a connection has been established between the calling party and subscriber 4 over calling party to subscriber 28 or to add subscriber 28 to the aforementioned established connection.

*Signaling the Secondary Exchange Attendant*

Referring now to FIG. 3, tip and ring conductors 14 and 15 of line circuit 5 are directly connected to tip and ring conductors 14*a* and 15*a*, of the portion 5*a* of line circuit 5, over break contacts 1 and 9, respectively, of transfer relay TR. To signal the attendant at secondary exchange 2*b*, subscriber 4 will operate, momentarily, non-locking signaling key 8 of substation circuit 4 of FIG. 1. The operation of signaling key 8 completes a circuit which extends from ground in substation circuit 4, over the closed contact of signaling key 8 to signaling lead 32, over contact 3 of line key 9 to transfer lead 24, and over break contact 2 of relay SL in transfer circuit 3*b* of FIG. 3 to battery through the winding of transfer relay TR. Relay TR operates in this circuit.

The operation of relay TR transfers conductors 14 and 15 of line circuit 5, from conductors 14*a* and 15*a* leading to substation 4, to the holding bridge constituted by inductor B via make contacts 2 and 8, respectively, of relay TR. Besides being bridged by inductor B, conductors 14 and 15 are now terminated, through capacitors T and R, respectively, and via conductors 36 and 37, respectively, at contacts 2 and 3, respectively, of attendant jack 40 at secondary exchange 2*b*. Conductors 36 and 37 are bridged toward secondary exchange 2b by inductor A in transfer circuit 3*b*.

Relay TR, in operating, also transfers conductors 14*a* and 15*a* of the portion 5*a* of line circuit 5, from conductors 14 and 15 leading to primary exchange 1, into transfer circuit 3*b* over make contacts 3 and 7, respectively, of relay TR. The portion 5*a* of line circuit 5, when extended into transfer circuit 3*b*, is divided into two parallel paths, a talking path and a battery path. The talking path can be traced from the aforementioned contacts 3 and 7 of relay TR, across break contacts 1 and 3, respectively, of unoperated relay X, and through capacitors T1 and R1, respectively, to terminals 42 and 43, respectively, on the previously traced extension of conductors 14 and 15. The battery path can be traced from contacts 3 and 7 of relay TR to ground and battery, respectively, through the upper and lower windings, respectively, of polar relay L in transfer circuit 3*b*. Relay L provides talking battery to subscriber 4 in a circuit which extends from fround through the upper winding of relay L, over contact 3 of relay TR to tip conductor 14*a*, over contact 1 of line key 9 in FIG. 1 to common tip conductor 22, through telephone circuit 7 including series contacts 16 and 17 to common ring conductor 23, over contact 2 of line key 9 to ring conductor 15*a*, and over contact 7 of relay TR in FIG. 3 to battery through the lower winding of relay L. Relay L operates in this circuit and, in so doing, completes a locking path for relay TR which extends from ground at contact 4 of relay TR over make contact 1 of relay L to battery through the winding of relay TR.

The operation of relay TR also, at its contact 4, prepares locking paths for itself under the control of jack 40 and of relay L. Finally, relay TR, in operating, lights lamp 41 associated with transfer circuit 3*b* at the attendant position in secondary exchange 2*b* in a circuit which extends from ground at make contact 5 of relay TR and over break contact 1 of relay SL to battery via conductor 39 and through the filament of lamp 41. The lighting of lamp 41 alerts the attendant to the existence of a call awaiting completion at jack 40 of the attendant position.

*Secondary Exchange Attendant Answers*

The attendant will respond to the lighting of lamp 41 in the usual manner by plugging one end of a cord circuit (not shown) into jack 40. The cord plug operates the contacts of jack 40 and this results in the operation of relay SL in a circuit which may be traced from ground at contact 1 of jack 40 and over conductor 35 and make contact 6 of relay TR to battery through the winding of relay SL. Also, upon the connection of the cord circuit to jack 40, battery is furnished to the cord sleeve from resistance lamp 42, and battery and ground through the lower and upper windings, respectively, of inductor A are furnished to the ring and tip conductors, respectively, of the cord circuit via ring and tip conductors 37 and 36, respectively. Transfer circuit 3*b* is thus made to appear as an inter-exchange trunk to the cord circuit of secondary exchange 2*b*. The attendant may now request information from subscriber 4 as to the identity of the desired subscriber and proceed to complete the connection to that subscriber, say subscriber 28 at substation 28 of FIG. 1, in the same manner as for a normal call from an inter-exchange trunk to a subscriber in secondary exchange 2*b*.

Meanwhile, relay SL, operated in response to the insertion of a cord plug into jack 40, has been effective to accomplish a number of circuit operations which may be enumerated as follows: (1) at contact 1 of relay SL, the operating circuit for lamp 41 is opened, thereby extinguishing that lamp; (2) at contact 5 of relay SL, a link is closed in the operating path for exclusion relay X; (3) at contact 3 of relay SL, a locking path for relay TR is completed, this path extending from ground at contact 1 of jack 40, over contacts 6 and 3 of relays TR and SL, respectively, to battery through the winding of relay TR; (4) at its contact 2, relay SL opens the original operating path for relay TR which extended from ground on transfer lead 24; and (5) relay SL completes a circuit for lighting busy lamp 13, which path may be traced from ground at contact 4 of relay TR, over contact 4 of relay SL to conductor 25, and through the filament of busy lamp 13 to battery. Lamp 13 will remain lighted for as long as transfer circuit 3*b* is in use, thus giving subscriber 4 a continuous visual indication of the status of line circuit 5.

When the attendant in secondary exchange 2*b* has completed the connection to subscriber 28 at substation 28 over line circuit 27, the calling party and subscribers 4 and 28 will be joined in talking relation with one another through capacitors at terminals 42 and 43 of the junction portion of transfer circuit 36; talking battery will be supplied to subscriber 4 from the windings of relay L, and talking battery will be supplied to subscriber 28 from inductor A; relays L, TR and SL of transfer circuit 3*b* are operated, busy lamp 13 of substation circuit 4 is lighted, and, at the attendant position in secondary exchange 2*b*, one of the usual indicating devices (not shown), such as a lamp associated with line circuit 27 or the station end of the cord circuit, informs the attendant of the active condition of that line circuit.

It will be noted that no dialing is performed by subscriber 4 in order to establish the instant conference connection. Dial contact 17 in telephone circuit 7 of substation circuit 4 is, therefore, not necessary to the manual embodiment of the instant invention.

*Disconnection—Subscriber 4 Disconnects First*

If, after having extended line circuit 5 through transfer circuit 3*b* to subscriber 28 in secondary exchange 2*b* as hereinbefore described, subscriber 4 desires to disassociate himself completely from the conference connection, he may either hang up (go "on hook") or depress another line key in substation circuit 4 (assuming that the line keys in substation circuit 4 are of the interlocking type). In either event, the previously traced operating circuit for relay L will be opened, causing this relay to release. The release of relay L will, at contact 1 thereof, open a locking path for relay TR; relay TR remains operated, however, over the locking path previously traced from make contact 3 of relay SL. At its contact 2, relay L will complete the operating path for relay X, which path can be traced from ground at contact 2 of relay L and over contact 5 of relay SL to battery through the winding of relay X. Relay X operates in this circuit and at its contacts 1 and 3 disconnects tip and ring conductors 14*a* and 15*a*, leading to substation circuit 4, from the conference connection. Relay X also completes a locking path for itself, under the control of relay SL, from ground at make contact 2 of relay X and over contact 5 of relay SL. It will be noted that no supervision is given secondary exchange 2*b* on this disconnect and that the attendant is therefore not alerted thereby.

Subscriber 4 may disconnect from the conference connection and still retain access thereto if substation circuit 4 is provided with means for holding on line circuit 5; that is, subscriber 4 would then be able to place a bridge (not shown) across conductors 14*a* and 15*a*, thereby preventing the release of relay L and the consequent operation of relay X.

*Subscriber 28 Disconnects After Subscriber 4*

Transfer circuit 3*b* is under the control of jack 40 after subscriber 4 has disconnected, and therefore under the control of the attendant at secondary exchange 2*b*. When subscriber 28 hangs up or otherwise opens line circuit 27, an indication of this action will be given the attendant in the usual manner for manual exchanges of whatever type happens to be employed, say by lighting a lamp or operating a drop at the substation end of the cord circuit (not shown) employed between jack 40 and line circuit 27. The attendant will then break down the connection (remove the cord circuit plug from jack 40) in the same manner as for a regular call between an inter-exchange trunk and a substation of secondary exchange 2*b*.

Assuming that subscriber 4 has not remained in on the connection, the removal of the cord circuit plug (not shown) will release the contacts of jack 40. At make contact 1 of jack 40, ground will be removed from the operating circuits of relays SL and TR of transfer circuit 3*b*; relay L will have been released previously when subscriber 4 left the connection. The release of relay TR disconnects inductor B from across conductors 14 and 15 of line circuit 5, thus providing a disconnect signal toward primary exchange 1. Relay SL, at contact 5 thereof, opens the operating circuit for relay X, thereby restoring the entire transfer circuit 3*b* to normal. Relay SL, in releasing, also removes ground from the operating circuit for busy lamp 13 at substation 4, extinguishing that lamp and thus indicating to subscriber 4 that line circuit 5 is now free. All of the circuits concerned have now restored to their normal condition and subscriber 4 is free to initiate and receive calls over line circuit 5 which is again continuous through transfer circuit 3*b*.

*Subscriber 28 Disconnects First*

When subscriber 28 is the first to disconnect from the three-way conference connection involving the calling party and subscribers 4 and 28, transfer circuit 3*b* is left under the control of subscriber 4. After the attendant has removed her cord plug from jack 40 in response to the disconnection of subscriber 28, relays TR and SL in transfer circuit 3*b* will not be able to release (as would be the case when subscriber 28 disconnects after subscriber 4, supra) due to the fact that relay L is still operated and, at its contact 1, maintains locking ground to the operating circuits of relays TR and SL. Inductor B will remain bridged across conductors 14 and 15 toward primary exchange 1, the calling party and subscriber 4 will remain in the talking relation through capacitors T1 and R1 of transfer circuit 3*b*, and busy lamp 13 will remain lighted.

When subscriber 4 finally disconnects after subscriber 28, the operating circuit for relay L will be opened and this relay will release, releasing in turn relays TR and SL and restoring transfer circuit 3*b* to normal.

*Replacing Subscriber 28 With Another Subscriber in the Secondary Exchange*

Subscriber 28 in secondary exchange 2*b*, who is joined in a transferred call or a three-way conference connection, can be replaced with a different subscriber in secondary exchange 2*b*, under the control of the attendant. If subscriber 28 has not yet disconnected, he may signal the attendant, say by flashing his switchhook in accordance with usual manual exchange practices, and request the desired replacement; in response to which request, the attendant will transfer the substation end of her cord circuit (not shown) to the switchboard appearance of the line circuit of the subscriber by whom subscriber 28 is to be replaced. It will be noted that changing the substation end of the cord circuit will not affect transfer circuit 2*b* in any way since control over transfer circuit 2*b* is maintained in secondary exchange 2*b* from make contact 1 of jack 40, independently of any circuit changes taking place on the substation end of the cord circuit.

If subscriber 4 has not disconnected or has not been excluded from the transferred condition, and subscriber 28 has already disconnected and the attendant has removed the cord plug from jack 40, subscriber 4 may cause another subscriber in secondary exchange 2*b* to be added to the connection by restoring transfer circuit 3*b* to normal and initiating a new request to the attendant by operating signaling key 8.

To accomplish the restoration to normal of transfer circuit 3*b*, subscriber 4 need only operate switchhook contact 16 of telephone circuit 7 momentarily. This will cause the release of relay L, which in turn will cause the release of relays TR and SL since these latter relays are no longer under the control of jack 40 after the cord plug has been removed therefrom. The release of relay TR will restore the continuity of line circuit 5 and all circuit elements will be in the same condition as for a normal call between the calling party and subscriber 4. Subscriber 4 may now signal the attendant at secondary exchange 2*b* in the manner previously described and request connection to the desired subscriber in that exchange.

It is to be understood that the above-described arrangements are merely illustrative of the application of the principles of the invention; numerous other arrangements may be devised by those skilled in the art without departing from the spirit and scope of the invention.

What is claimed is:

1. In a telephone system, a first and a second telephone exchange, a subscriber's substation having a substation circuit, a line circuit independent of said second exchange and extending from said first exchange to said substation, an automatic transfer circuit intermediate said substation and said exchanges and associated with said line circuit, means in said transfer circuit for linking said transfer circuit with said second exchange, relay means in said transfer circuit operable to terminate said line circuit in said transfer circuit and to extend a connection from said substation circuit to said second exchange, a transfer conductor extending from said relay means to said substation, and control means in said substation circuit operable to cause said transfer circuit to extend said line circuit to said second exchange via said linking means, said control means comprising means operable to connect said line circuit and said transfer conductor to said substation circuit, and comprising two-position signaling means operable from one to the other of its positions to operate said relay means via said conductor when said signaling means is operated concurrently with said connecting means.

2. The invention claimed in claim 1 wherein is provided at least one other line circuit extending from said second exchange to said substation, and wherein said line circuit is extended to said second exchange in bypass of said other line circuit.

3. The invention claimed in claim 1 wherein means is provided in said transfer circuit for excluding said substation from said extended line circuit.

4. The invention claimed in claim 1 wherein said linking means includes exclusion means operable under the control of said control means to exclude said substation circuit from said extended line circuit, and wherein are provided in said linking means capacitors through which said line circuit is extended to said second exchange.

5. In a telephone system, a first and a second telephone exchange, a subscriber's substation having a substation circuit, a line circuit independent of said second exchange and extending from said first exchange to said substation, an automatic transfer circuit intermediate said substation and said exchanges and associated with said line circuit, means in said transfer circuit for linking said second exchange with said transfer circuit, relay means in said transfer circuit operable to terminate said line circuit in said transfer circuit and to extend a connection from said substation circuit to said second exchange, a transfer conductor extending from said relay means to said substation, control means in said substation circuit operable to cause said transfer circuit to extend said line circuit to said second exchange via said linking means, said control means comprising means operable to connect said line circuit and said transfer conductor to said substation circuit, said control means also comprsing signaling means including a two-position signaling key operable from one to the other of its positions to operate said relay means via said conductor when said signaling means is operated concurrently with said connecting means, and indicating means at said substation operable under the control of said transfer circuit to indicate that said transfer circuit is in use.

6. In a telephone system, a first and a second telephone exchange, a subscriber's substation having a substation circuit, a line circuit independent of said second exchange, an automatic transfer circuit intermediate said substation and said exchanges and associated with said line circuit, a first and a second portion of said line circuit, said first portion extending from said first exchange to said transfer circuit and said second portion extending from said transfer circuit to said substation, relay means in said transfer circuit effective when unoperated to join said portions with each other and effective when operated to terminate said portions separately in said transfer circuit and to extend a connection from said substation circuit to said second exchange, means for linking said transfer circuit with said second exchange, a transfer conductor extending from said relay means to said substation, control means in said substation circuit operable to cause said transfer circuit to extend said portions to said second exchange via said linking means, said control means comprising means operable to connect said line circuit and said transfer conductor to said substation circuit, said control means also comprising signaling means including a two-position signaling key operable from one to the other of its positions to operate said relay means via said conductor when said signaling means is operated concurrently with said connecting means, and indicating means at said substation operable under the control of said transfer circuit to indicate that said transfer circuit is in use.

7. In a telephone system, a first and a second telephone exchange, a subscriber's substation having a substation circuit, a line circuit independent of said second exchange, an automatic transfer circuit intermediate said substation and said exchanges and associated with said line circuit, a first and a second portion of said line circuit, said first portion extending from said first exchange to said transfer circuit and said second portion extending from said transfer circuit to said substation, relay means in said transfer circuit effective when unoperated to join said portions with each other and effective when operated to terminate said portions separately in said transfer circuit, means in said transfer circuit effective upon the separate termination of said second portion to supply talking battery to said second portion, means in said transfer circuit effective upon the separate termination of said first portion to place a holding condition on said first portion toward said first exchange, means for linking said transfer circuit with said second exchange, a transfer conductor extending from said relay means to said substation, control means in said substation circuit operable to cause said transfer circuit to extend said portions to said second exchange via said linking means, said control means comprising means operable to connect said line circuit and said transfer conductor to said substation circuit, said control means also comprising signaling means including a two-position signaling key operable from one to the other of its positions to operate said relay means via said conductor when said signaling means is operated concurrently with said connecting means, and indicating means at said substation operable under the control of said transfer circuit to indicate that said transfer circuit is in use.

8. In a telephone system, a first and a second telephone exchange; a line circuit extending from said first exchange, said line circuit having a first and a second portion; a subscriber's substation having a substation circuit, said substation circuit comprising a telephone circuit, a line key having at least three pairs of contacts controlled thereby, said line key operable to close a first and a second and a third contact pair, two conductors connecting said telephone circuit to said first and second contact pairs, a two-position signaling key operable from one to the other of its positions to generate an electrical condition, a signaling conductor connecting said signaling key and said third contact pair, a substation terminus of said second portion at said first and second contact pairs, said second portion substation terminus being connectable to said two conductors upon the operation of said line key, a transfer conductor terminating at said third contact pair and extending away from said substation circuit, said transfer conductor being connectable to said signaling conductor upon the operation of said line key and effective to transmit said electrical condition when said line key and said signaling key are operated concurrently, and an illuminable lamp associated with said second portion; and an automatic transfer circuit intermediate said substation and said exchanges and associated with said line circuit, said transfer circuit comprising a transfer appearance of said transfer conductor, a first transfer terminus of each of said first and second portions, said first portion extending from its first transfer terminus to said first exchange and said second portion extending from its first transfer terminus to said substation terminus, a transfer relay effective when unoperated to join said portions at said first transfer termini and operative in response to the transmission of said electrical condition by said transfer conductor to disjoin said portions at said first transfer termini and to terminate said portions separately in said transfer circuit, an energy source effective upon the separate termination of said second portion in said transfer circuit to supply talking battery to said second portion, a coil effective upon the separate termination of said first portion in said transfer circuit to place a holding condition on said first portion toward said first exchange, a metallic circuit for connecting said transfer circuit to said second exchange, a lighting circuit for illuminating said lamp to indicate the busy condition of said transfer circuit, and a junction for joining the separate termination of said portions with said metallic circuit, whereby said portions are extended to said second exchange via said junction and via said metallic circuit in response to the operation of said signaling key.

9. In a telephone system, a first and a second telephone exchange, said second exchange being a manual exchange having an attendant position; a line circuit extending from said first exchange, said line circuit having a first and a second portion; a subscriber's substation having a substation circuit, said substation circuit comprising a telephone circuit, a line key having at least three pairs of contacts controlled thereby, said line key operable to close a first and a second and a third contact pair, two conductors connecting said telephone circuit to said first and second contact pairs, a two-position signaling key operable from one to the other of its positions to generate an electrical condition, a signaling conductor connecting said signaling key and said third contact pair, a substation terminus of said second portion at said first and second contact pairs, said second portion substation terminus being connectable to said two conductors upon the operation of said line key, a transfer conductor terminating at said third contact pair and extending away from said substation circuit, said transfer conductor being connectable to said signaling conductor upon the operation of said line key and effective to transmit said electrical condition when said line key and said signaling key are operated concurrently, and an illuminable lamp associated with said line circuit; an automatic transfer circuit intermediate said substation and said exchanges and associated with said line circuit, said transfer circuit comprising a transfer appearance of said transfer conductor, a first transfer terminus of each of said first and second portions, said first portion extending from its first transfer terminus to said first exchange and said second portion extending from its first transfer terminus to said substation terminus, a first relay effective when unoperated to join said portions at said first transfer termini and operative in response to the transmission of said electrical condition by said transfer conductor to disjoin said portions at said first transfer termini and to terminate said portions separately in said transfer circuit, an energy source effective upon the separate termination of said second portion in said transfer circuit to supply talking battery to said second portion, a coil effective upon the separate termination of said first portion in said transfer circuit to place a holding condition on said first portion toward said first exchange, a metallic circuit for connecting said transfer circuit to said second exchange, a lighting circuit energizable to illuminate said lamp to indicate the busy condition of said transfer circuit, a junction for joining the separate terminations of said portions with said metallic circuit, and a second relay operable to energize said lighting circuit; and an exchange appearance of said metallic circuit in said second exchange at said attendant position, said exchange appearance comprising alerting means activated in response to the operation of said first relay to indicate a calling condition at said exchange appearance and deactivated in response to the operation of said second relay, and jack means operable to operate said second relay and to connect said transfer circuit into said second exchange; whereby said portions are extended into said second exchange via said junction and via said metallic circuit and via said jack means in response to the operation of said signaling key and said jack means.

10. The invention claimed in claim 9 wherein said telephone circuit has a switchhook contact, wherein said energy source comprises a third relay under the control of said line key and said switchhook contact and operative upon the separate termination of said second portion in said transfer circuits, wherein said metallic circuit comprises a tip and a ring conductor, and wherein said tip and ring conductors are bridged by a source of talking battery toward said jack means.

11. The invention claimed in claim 9 wherein is provided at least one other line circuit extending from said second exchange and terminating at said substation, wherein is provided in said substation circuit at least one other line key having two normally open contact pairs and being operable to close said two contact pairs to connect said other line circuit to said two conductors, and wherein said portions are extended into said second exchange in bypass of said other line circuit.

12. The invention claimed in claim 9 wherein are provided at said junction capacitors through which said portions and said metallic circuit are joined capacitively in parallel conference relation, and wherein said transfer circuit includes an exclusion relay operable under the control of said substation circuit and of said second relay to disconnect said second portion from said junction.

13. In a telephone system, a first and a second telephone exchange, said second exchange being an automatic exchange, a line circuit extending from said first exchange, said line circuit having a first and a second portion; a subscriber's substation having a substation circuit, said substation circuit comprising a telephone circuit, a pulse generating means in said telephone circuit, a line key having at least three pairs of contacts controlled thereby, said line key operable to close a first and a second and a third contact pair, two conductors connecting said telephone circuit to said first and second contact pairs, a two-position signaling key operable from one to the other of its positions to generate an electrical condition, a signaling conductor connecting said signalinng key and said third contact pair, a substation terminus of said second portion at said first and second contact pairs, said second portion substation terminus being connectable to said two conductors upon the operation of said line key, a transfer conductor terminating at said third contact pair and extending away from said substation circuit, said transfer conductor being connectable to said signaling conductor upon the operation of said line key and effective to transmit said electrical condition when said line key and said signaling key are operated concurrently, and an illuminable lamp associated with said line circuit; an automatic transfer circuit intermediate said substation and said exchanges and associated with said line circuit, said transfer circuit comprising a transfer appearance of said transfer conductor, a first transfer terminus of each of said first and second portions, said first portion extending from its first transfer terminus to said first exchange and said second portion extending from its first transfer terminus to said substation terminus, a first relay effective when unoperated to join said portions at said first transfer termini and operative in response to the transmission of said electrical condition by said transfer conductor to disjoin said portion at said first transfer termini and to terminate said portions separately in said transfer circuit, an energy source effective upon the separate termination of said second portion in said transfer circuit to supply talking battery to said second portion, a coil effective upon the separate termination of said first portion in said transfer circuit to place a holding condition on said first portion toward said first exchange, a metallic circuit for connecting said transfer circuit to said second exchange, a lighting circuit energizable to illuminate said lamp to indicate the busy condition of said transfer circuit, said lighting circuit being energized upon the operation of said first relay, a junction for joining the separate terminations of said portions with said metallic circuit, pulse repeating means operable to repeat over said metallic circuit pulses generated by said pulse generating means, and means responsive to a supervisory signal from said second exchange over said metallic circuit to interconnect said portions and said metallic circuit at said junction.

14. The invention claimed in claim 13 wherein said energy source comprises a second relay under the control of said pulse generating means, and operative upon the separate termination of said second portion in said transfer circuit, wherein said metallic circuit comprises a line circuit of said second exchange, and wherein said pulse repeating means includes means effective upon the operation of said second relay to bridge said metallic circuit, thereby instituting a request for service to said second exchange.

15. The invention claimed in claim 14 wherein said pulse generating means comprises a dial contact for generating dial pulses, wherein said pulse repeating means includes a third and a fourth relay, said third relay being a slow-release relay operative in response to the operation of said second relay, said fourth relay being operative upon the operation of said third relay and a subsequent release of said second relay to render said bridging means ineffective, and wherein said interconnecting means comprises a fifth and a sixth relay, said fifth relay being operative in response to said supervisory signal to operate said sixth relay and said latter relay effective when operated to extend said first portion to said junction.

16. The invention claimed in claim 13 wherein is provided at least one other line circuit extending from said second exchange and terminating at said substation, wherein is provided in said substation circuit at least one other line key having two normally open contact pairs and being operable to close said two contact pairs to connect said other line circuit to said two conductors, and wherein said portions and said metallic circuit are interconnected in bypass of said other line circuit.

17. The invention claimed in claim 13 wherein are provided at said junction capacitors through which said portions and said metallic circuit are joined capacitively in parallel conference relation, and wherein said transfer circuit includes an exclusion relay operable under the control of said substation circuit and of said interconnecting means to disconnect said second portion from said junction.

References Cited in the file of this patent

UNITED STATES PATENTS

| | | |
|---|---|---|
| 2,172,874 | Kahl | Sept. 12, 1939 |
| 2,337,875 | Dewire | Dec. 28, 1943 |
| 2,816,958 | Wadsworth | Dec. 17, 1957 |